United States Patent [19]
Blau

[11] Patent Number: 5,634,101
[45] Date of Patent: May 27, 1997

[54] METHOD AND APPARATUS FOR OBTAINING CONSUMER INFORMATION

[75] Inventor: Robert A. Blau, Golden Valley, Minn.

[73] Assignee: R. Alan Blau & Associates, Co., Minneapolis, Minn.

[21] Appl. No.: 480,560

[22] Filed: Jun. 7, 1995

Related U.S. Application Data

[63] Continuation of Ser. No. 180,108, Jan. 12, 1994, abandoned, which is a continuation of Ser. No. 708,466, May 31, 1991, abandoned.

[51] Int. Cl.⁶ .................................................. G06F 17/60
[52] U.S. Cl. ............................................ 395/210; 395/211
[58] Field of Search .................................. 364/401, 419, 364/406; 358/84–86; 235/456, 487; 395/210

[56] References Cited

U.S. PATENT DOCUMENTS

| | | | |
|---|---|---|---|
| 4,744,050 | 5/1988 | Hirosawa et al. | 364/419 |
| 4,868,750 | 9/1989 | Kucera et al. | 364/419 |
| 4,937,439 | 6/1990 | Wanninger et al. | 235/456 |
| 4,958,284 | 9/1990 | Bishop et al. | 364/419 |
| 5,034,807 | 7/1991 | Von Kohorn | 358/84 |

*Primary Examiner*—Gail O. Hayes
*Assistant Examiner*—Frantzy Poinvil
*Attorney, Agent, or Firm*—Merchant, Gould, Smith, Edell, Welter & Schmidt, P.A.

[57] ABSTRACT

A method and apparatus for obtaining consumer information based on aspirational imagery. The consumer information facilitates product concept, positioning and product marketing, as well as development of advertising strategy.

9 Claims, 18 Drawing Sheets

FIG. 2A
PRIOR ART

(PLEASE WRITE IN YOUR NAME ON LINE ABOVE) _____ (1-4) ____ (5)
PLEASE USE BALL POINT PEN OR PENCIL – PRESS FIRMLY (1) [A]  ▶ IN THIS SPACE, WRITE IN ONE ADVANTAGE A PERSON MIGHT GET FROM THIS THE PRODUCT FEATURE DESCRIBED TO THE LEFT. USE FIVE WORDS OR MORE

DO NOT COPY ANY PREVIOUS ANSWER (2) [B]  ▶ IN THIS SPACE, WRITE IN A SECOND ADVANTAGE A PERSON MIGHT GET FROM THIS THE PRODUCT FEATURE DESCRIBED TO THE LEFT. USE FIVE WORDS OR MORE

WHEN COMPLETED, TURN THE PAGE

© 1988 R. ALAN BLAU & ASSOCIATES, INC.,

PRODUCT   DESCRIPTION 42
42A

DO NOT COPY ANY PREVIOUS ANSWER

C

[E]   (5)

IN THE SPACE ABOVE, WRITE IN ONE BENEFIT A PERSON MIGHT GET AS A RESULT OF THE FACT DESCRIBED TO THE LEFT. USE FIVE WORDS OR MORE.

WHEN COMPLETED, TURN THE PAGE

(PLEASE WRITE IN YOUR NAME ON LINE ABOVE)
PLEASE USE BALL POINT PEN OR PENCIL – PRESS FIRMLY                    (1-4)   (5)

(1)
→ IN THIS SPACE,
WRITE IN ONE ADVANTAGE A PERSON MIGHT GET
FROM THIS THE PRODUCT FEATURE DESCRIBED TO THE LEFT
USE FIVE WORDS OR MORE

[A]

DO NOT COPY ANY PREVIOUS ANSWER (2)
→ IN THIS SPACE,
WRITE IN A SECOND ADVANTAGE A PERSON MIGHT GET
FROM THIS THE PRODUCT FEATURE DESCRIBED TO THE LEFT
USE FIVE WORDS OR MORE

[B]

WHEN COMPLETED,
TURN THE PAGE

© 1988 R. ALAN BLAU & ASSOCIATES, INC.,

PRODUCT          DESCRIPTION

IN THE SPACE BELOW,
PLEASE DESCRIBE A SITUATION IN
WHICH SOMEONE MIGHT
EXPERIENCE SATISFACTION
FROM THE BENEFITS IN
THE SQUARES AT THE LEFT (5)

[E]

C

D

DO NOT COPY ANY PREVIOUS ANSWER

WHEN COMPLETED,
TURN THE PAGE

IN THE SPACE BELOW, PLEASE DESCRIBE A SITUATION IN WHICH SOMEONE MIGHT EXPERIENCE SATISFACTION FROM THE BENEFITS IN THE SQUARES AT THE LEFT (8)

[H]

F

G

DO NOT COPY ANY PREVIOUS ANSWER

WHEN COMPLETED, RETURN TO INTERVIEWER

| RESPONSE SUMMARY | | | |
|---|---|---|---|
| NET TOTAL ADVANTAGES, BENEFITS AND SITUATIONS | TOTAL FEMALE | SUB-TOTAL FEMALE | TOTAL MALE |
| | | | |
| PRODUCT PERFORMANCE BENEFITS | | | |
| CONVENIENCE/MONEY SAVING (NET) | 74% | 100% | 84% |
| MONEY SAVING (SUB-NET) | 49% | 66% | 39% |
| TIME SAVING (SUB-NET) | 47% | 63% | 78% |
| SPACE SAVING (SUB-NET) | 43% | 58% | 24% |
| EASE OF USE (SUB-NET) | 10% | 14% | 32% |
| | | | |
| ALL BENEFITS (NET) | 59% | 100% | 78% |
| APPEARANCE (SUB-NET) | 44% | 74% | 58% |
| MANAGEABILITY/CONTROL (SUB-NET) | 23% | 39% | 51% |
| TEXTURE (SUB-NET) | 19% | 32% | 14% |
| CONDITIONING (SUB-NET) | 17% | 28% | 10% |
| AROMA (SUB-NET) | 2% | 4% | 5% |
| | | | |
| POSITIVE OR FAVORABLE PRODUCT ATTRIBUTE (NET) | 9% | 9% | 7% |
| OTHER (NET) | 4% | 4% | 9% |
| NEGATIVE PRODUCT ATTRIBUTE (NET) | 5% | 5% | 3% |
| | | | |
| EMOTIONAL BENEFITS/VALUE SATISFACTION | | | |
| SELF-CONFIDENCE/SELF-ESTEEM BENEFITS (NET) | 62% | 100% | 57% |
| FEMALE GENDER ROLE SUPPORT (SUB-NET) | 37% | 60% | |
| MALE GENDER ROLE SUPPORT (SUB-NET) | 16% | 26% | 6% |
| | | | |
| SITUATION DEFINITIONS ANY (NET) | 66% | 100% | 57% |
| SOCIAL/FAMILY (SUB-NET) | 48% | 73% | 19% |
| INTIMATE/ROMANTIC (SUB-NET) | 38% | 57% | 28% |
| JOB/WORK/BUSINESS (SUB-NET) | 8% | 13% | 37% |
| | | | |
| SITUATION/DETAIL BENEFITS (NET) | 52% | 100% | 42% |
| SOCIAL/FAMILY/DETAIL BENEFITS (SUB-NET) | 43% | 82% | 16% |
| INTIMATE ROMANTIC BENEFITS (SUB-NET) | 32% | 62% | 23% |
| JOB/WORK/BUSINESS BENEFITS (SUB-NET) | 6% | 12% | 27% |

FIG. 5A  STUDY/SUMMARY OF KEY WORDS—FREQUENCY ORDER

| | | FREQUENCIES | | |
|---|---|---|---|---|
| | ADVANTAGES | BENEFITS | SITUATIONS | TOTAL |
| HAIR, HAIRED, HAIRLINE, HAIRS | 267 | 320 | 243 | 830 |
| LOOK, LOOKED, LOOKING, LOOKS | 100 | 155 | 186 | 441 |
| TIME, TIMELINESS,TIMES, TIMESAVINGS | 81 | 175 | 137 | 393 |
| MORE | 72 | 211 | 90 | 373 |
| SHAMPOO, SHAMPOOED, SHAMPOOING, SHAMPOOS | 125 | 94 | 108 | 327 |
| FEEL, FEELING, FEELS | 60 | 101 | 91 | 252 |
| GOOD | 48 | 88 | 108 | 244 |
| CONDITION, CONDITIONED, CONDITIONER, CONDITIONERS, CONDITIONING, CONDITIONS | 116 | 66 | 61 | 243 |
| SAVE, SAVED, SAVER, SAVES, SAVING, SAVINGS | 72 | 110 | 58 | 240 |
| CLEAN, CLEANED, CLEANER, CLEANING, CLEANLINESS, CLEANNESS, CLEANS | 75 | 72 | 63 | 210 |
| USE, USED, USEFUL, USER, USES, USING | 66 | 78 | 59 | 203 |
| SHOWER, SHOWERED, SHOWERING, SHOWERS | 31 | 80 | 90 | 201 |
| PRODUCT, PRODUCTS | 51 | 69 | 72 | 192 |
| EASE, EASIER, EASILY, EASY | 59 | 79 | 46 | 184 |
| BETTER | 47 | 85 | 41 | 173 |
| BOTTLE, BOTTLES | 49 | 79 | 45 | 173 |
| MONEY | 26 | 82 | 57 | 165 |
| HUSBAND, HUSBANDS | 33 | 49 | 75 | 157 |

FIG. 5B

| | | | | |
|---|---|---|---|---|
| HUSBAND, HUSBANDS | 33 | 49 | 75 | 157 |
| WORK, WORKDAY, WORKED, WORKER, WORKERS, WORKING, WORKS | 6 | 27 | 88 | 121 |
| SPEND, SPENDING, SPENDS, SPENT | 16 | 57 | 42 | 115 |
| LIKE, LIKED, LIKELY, LIKES | 17 | 42 | 54 | 113 |
| NEED, NEEDED, NEEDING, NEEDS | 26 | 44 | 29 | 99 |
| MANAGE, MANAGEABILITY, MANAGEABLE, MANAGING | 52 | 33 | 9 | 94 |
| WIFE, WIFES | 6 | 20 | 68 | 94 |
| ME | 9 | 30 | 46 | 85 |
| COMB, COMBED, COMBING, COMBS | 19 | 36 | 16 | 71 |
| CONFIDENCE, CONFIDENT, CONFIDENTLY | 12 | 33 | 25 | 70 |
| HER, HERS, HERSELF | 9 | 21 | 40 | 70 |
| WASH, WASHED, WASHES, WASHING | 11 | 22 | 37 | 70 |
| WOMAN, WOMANS, WOMEN, WOMENS | 6 | 21 | 42 | 69 |
| NICE, NICER | 12 | 21 | 35 | 68 |
| APPEAR, APPEARS, APPEARANCE, APPEARANCES | 11 | 30 | 23 | 64 |

METHOD AND APPARATUS FOR OBTAINING CONSUMER INFORMATION

This is a continuation of application Ser. No. 08/180,108, filed Jan. 12, 1994, now abandoned, which is a continuation of prior application Ser. No. 07/708,466, filed on May 31, 1991, now abandoned.

BACKGROUND OF THE INVENTION

The present invention relates to a method and apparatus for obtaining consumer information which facilitates product concept, positioning and product marketing, as well as development of advertising strategy.

Consumers tend to create relevant fantasies leading to the purchase and use of products with high image appeal. A term frequently applied to this is "aspirational imagery". That is, in response to stimuli such as advertising or other promotion, consumers imagine ideal situations in which they experience satisfaction from product use.

If a market research person were able to identify these ideal situations, they could be incorporated in product concept definition/descriptions and in product advertising. Before investing in expensive execution or even testing, one's marketing efforts could be positioned to be more precisely on target with greater impact, credibility, persuasiveness and sales effectiveness.

Previous methods and apparatus of obtaining product marketing information from consumers did not determine the consumers "aspirational imagery". The present invention solves these and other problems associated with the prior art.

SUMMARY OF THE INVENTION

The present invention relates to a method of obtaining product marketing information from consumers comprising the steps of:

providing a product description to a consumer;

querying the consumer to provide at least one advantage derived from the product description;

querying the consumer to provide at least one benefit derived from the advantage;

querying the consumer to describe at least one situation in which a person might experience satisfaction from the benefit;

storing the consumer responses on a memory device of a data processing system; and processing the consumer responses.

The present invention further relates to a method of obtaining product marketing information from consumers comprising the steps of:

obtaining consumer responses describing situations from which a consumer might experience satisfaction when using a certain product; and processing the consumer responses to facilitate product marketing.

The present invention further relates to a multiple page form used in obtaining product marketing information from consumers comprising:

an advantage page querying a consumer for at least one advantage associated with a product feature;

a benefit page querying the consumer for at least one benefit associated with the advantage; and a situation page for the consumer to describe a situation associated with the benefit.

When consumers anticipate the benefits of product use, they think in pictures rather than words. The present invention provides a quantitative research method designed to induce consumers to reveal their very private visions.

The present invention provides a method and apparatus that systematically and progressively probes deeper and deeper into consumer value systems and images making it possible for the market researcher to go beyond the limits of other research techniques to penetrate the veil of privacy that surrounds consumer fantasy and view the private thoughts and pictures in consumers' minds.

Prior art methods and apparatus produce verbal benefit descriptors and rational constructs, but fall short of the imagery that consumers conjure in anticipation of product use. The present invention allows one to identify and describe the detail of "ideal situations", the players, the activities, the locations, the feelings, the language, and the specific product benefit satisfactions and gratifications that fill aspirational imagery.

The present invention further provides quantified measures of frequency and distribution from large geographically disbursed samples.

One embodiment of the present invention also facilitates understanding of the train of thought in the consumers' minds which lead from product feature to benefit identification and anticipated usage satisfaction.

Yet another advantage of one embodiment of the present invention is that it provides one with clear, understandable information ready for implementation, as it operates in a parallel cognitive mode processed through its own data processing system so that output is systematically organized in a logical framework, thereby yielding actionable direction with meaningful messages for marketing and advertising.

The present invention facilitates the perfection of new product concepts, the restage and upgrade of existing product positions, and the creation of effective advertising strategy and execution. The present invention further provides information on what benefits and features to present in concept definition as well as what usage application to illustrate or describe to achieve maximum acceptance of a product. The present invention further facilitates an understanding of advertising execution required to maximize motivation. This might include what language to use, what scenes and situations to show that are most identifiable with target consumers, etc.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE FIGURES

In the figures wherein like reference numerals indicate generally corresponding parts throughout the several views:

Figure 2B:
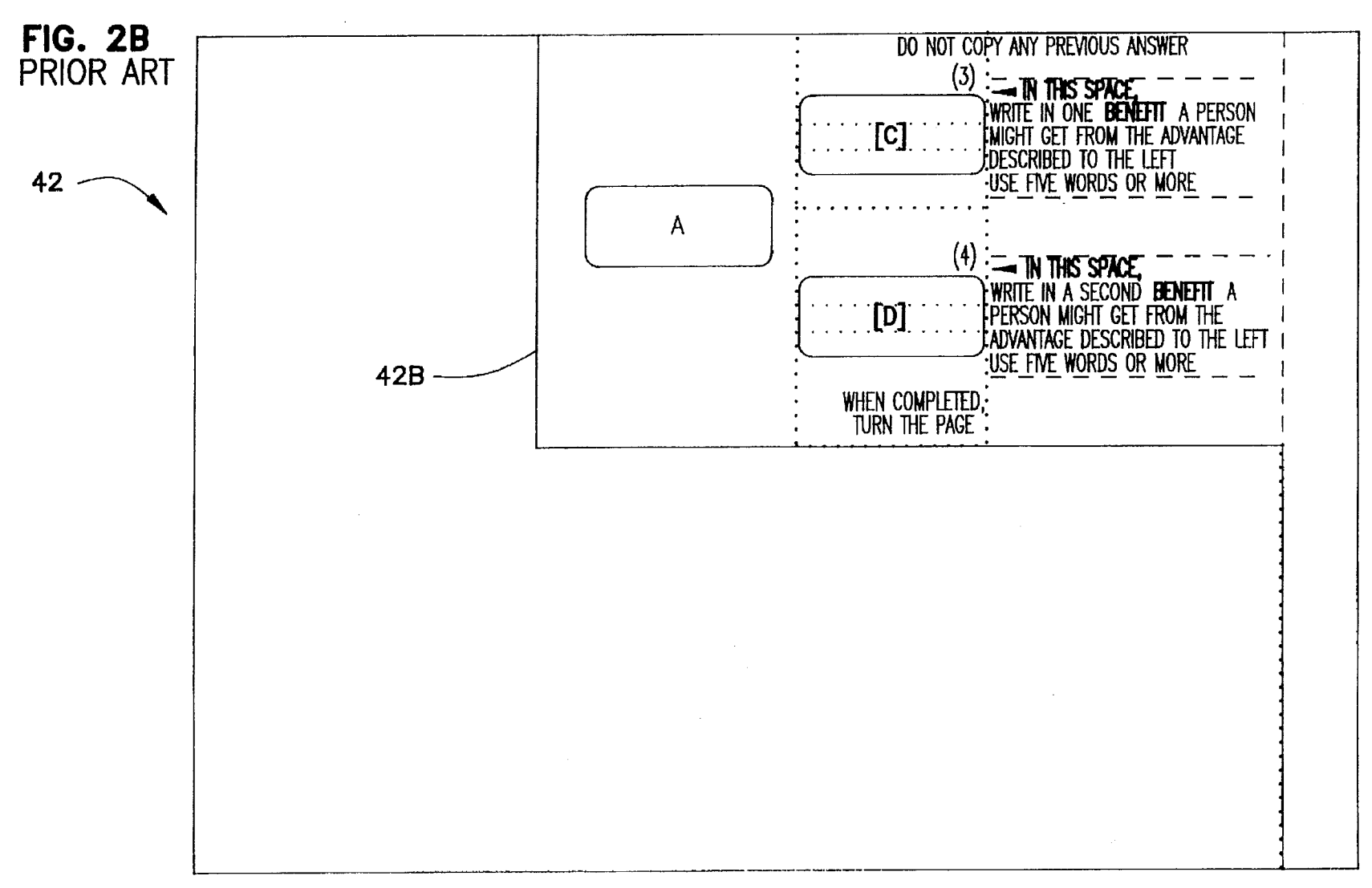

FIGS. 2A–2H illustrate a multiple page prior art form;

FIGS. 3A–3F illustrate an embodiment of a multiple page form in accordance with the principles of the present invention;

FIG. 4 is a sample print-out of consumer responses in accordance with the principles of the present invention; and FIG. 5 is a sample print-out of key word frequency in accordance with the principles of the present invention.

DETAILED DESCRIPTION OF A PREFERRED EMBODIMENT OF THE PRESENT INVENTION

Figure 1:
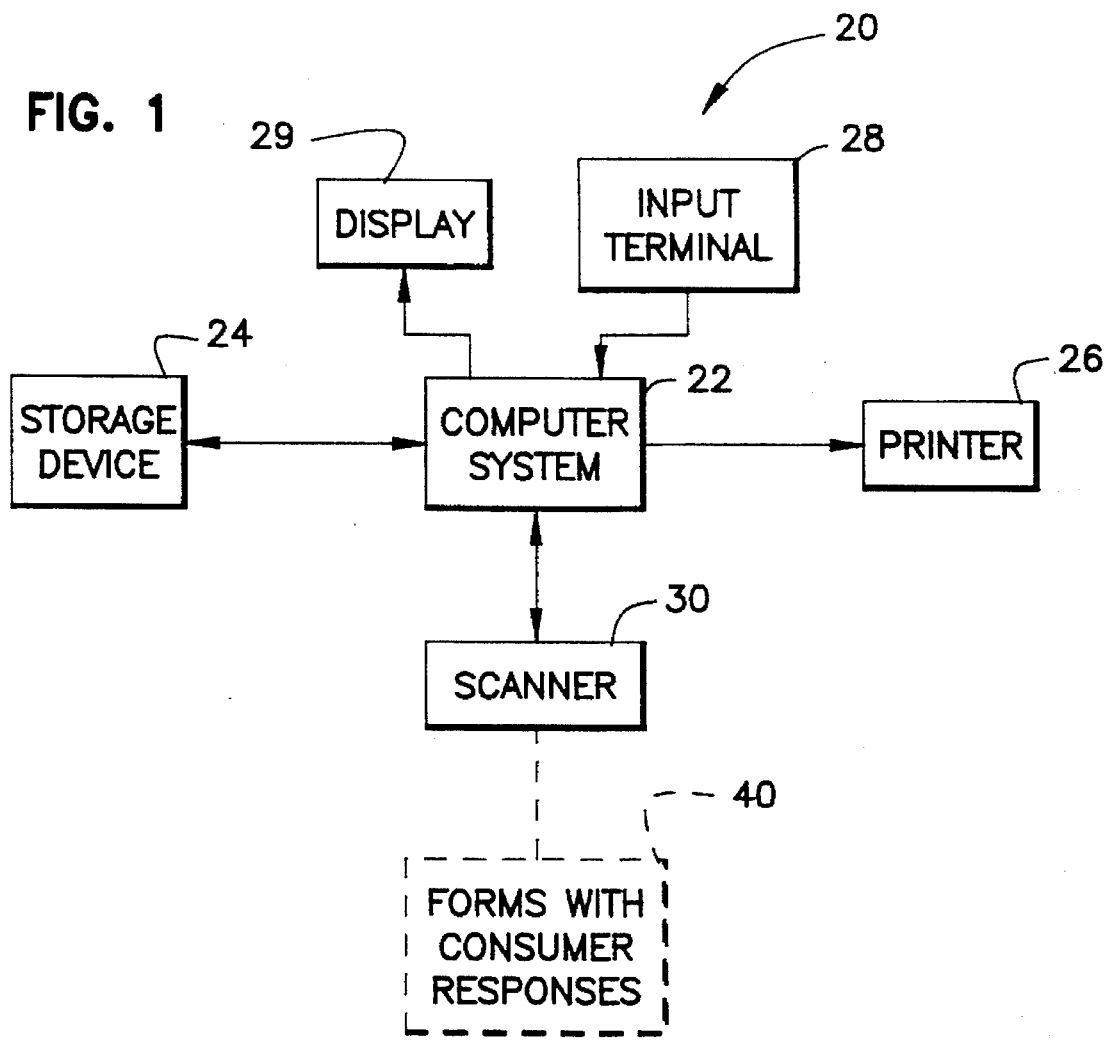
FIG. 1 is a diagrammatic illustration of an embodiment in accordance with the principles of the present invention.
Figure 2D:
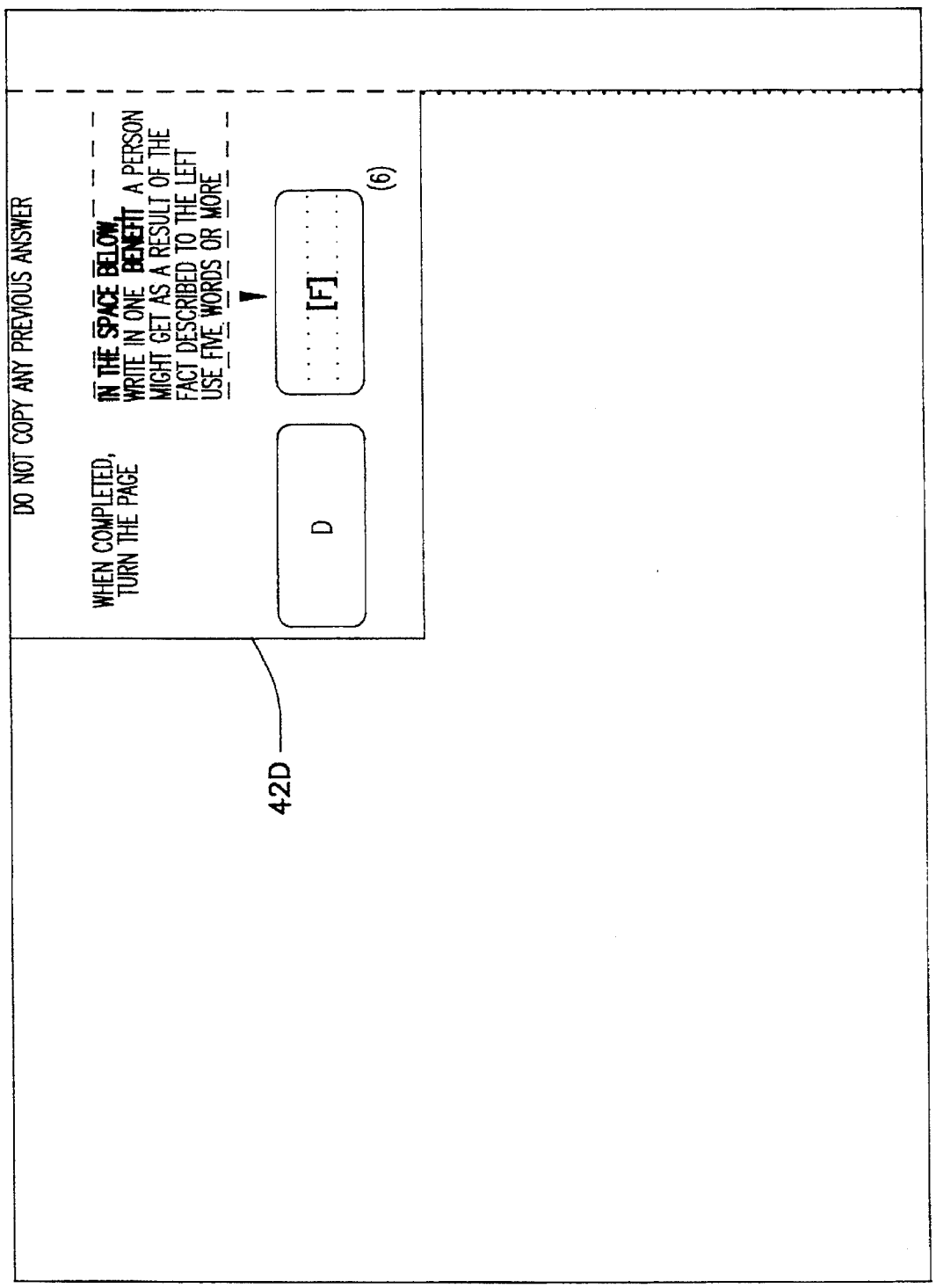
Figure 2E:
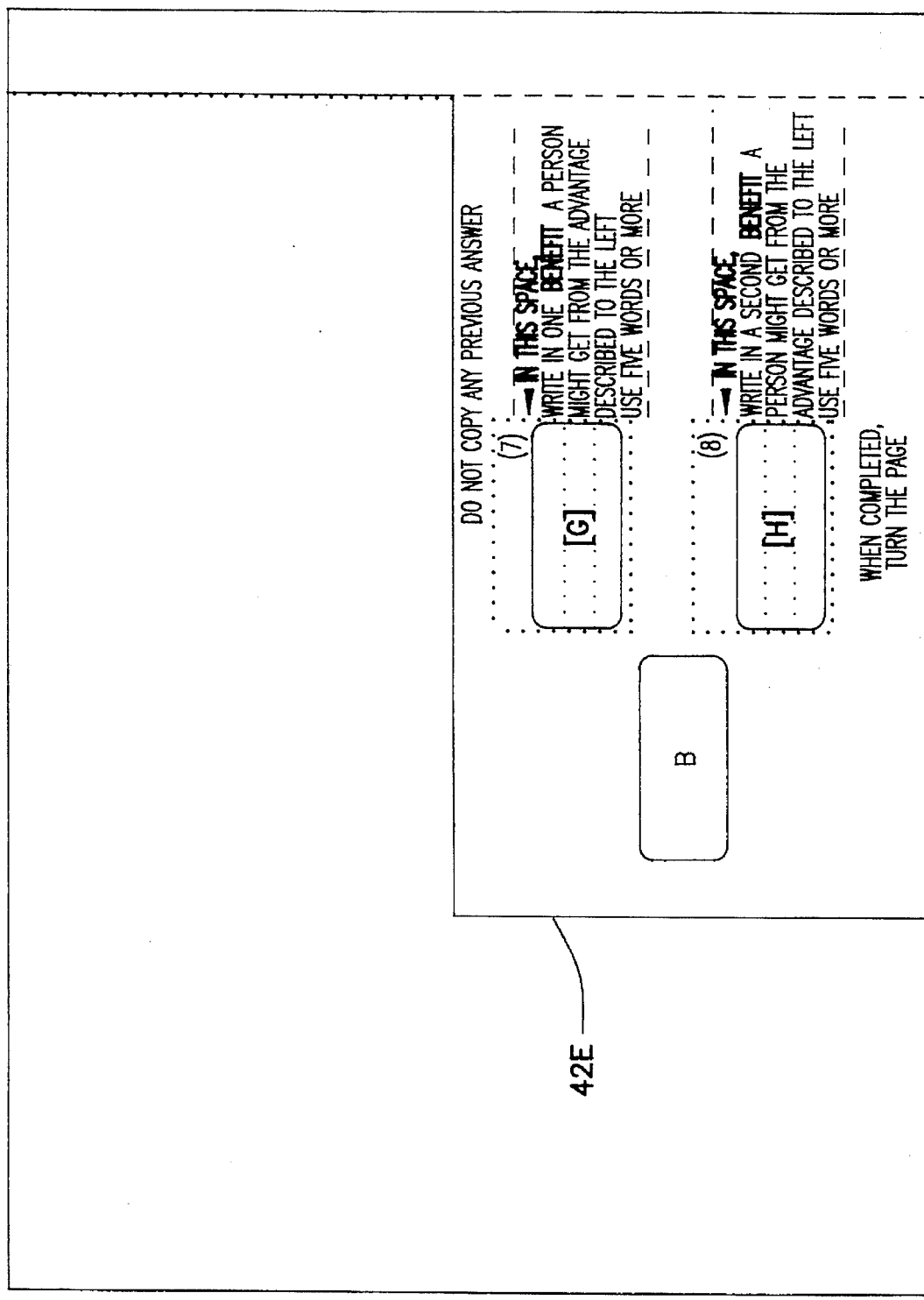
Figure 2F:
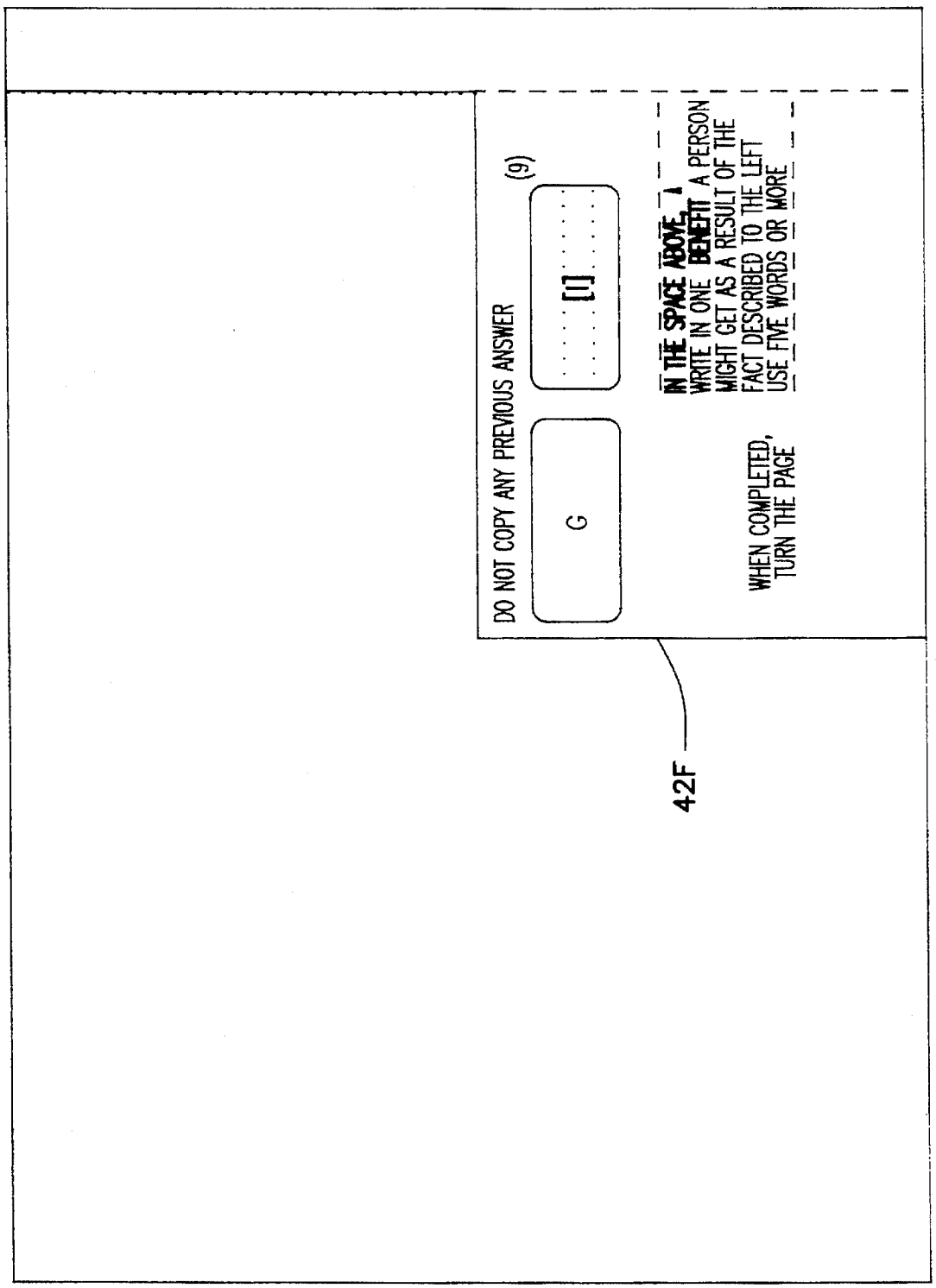
Figure 2G:
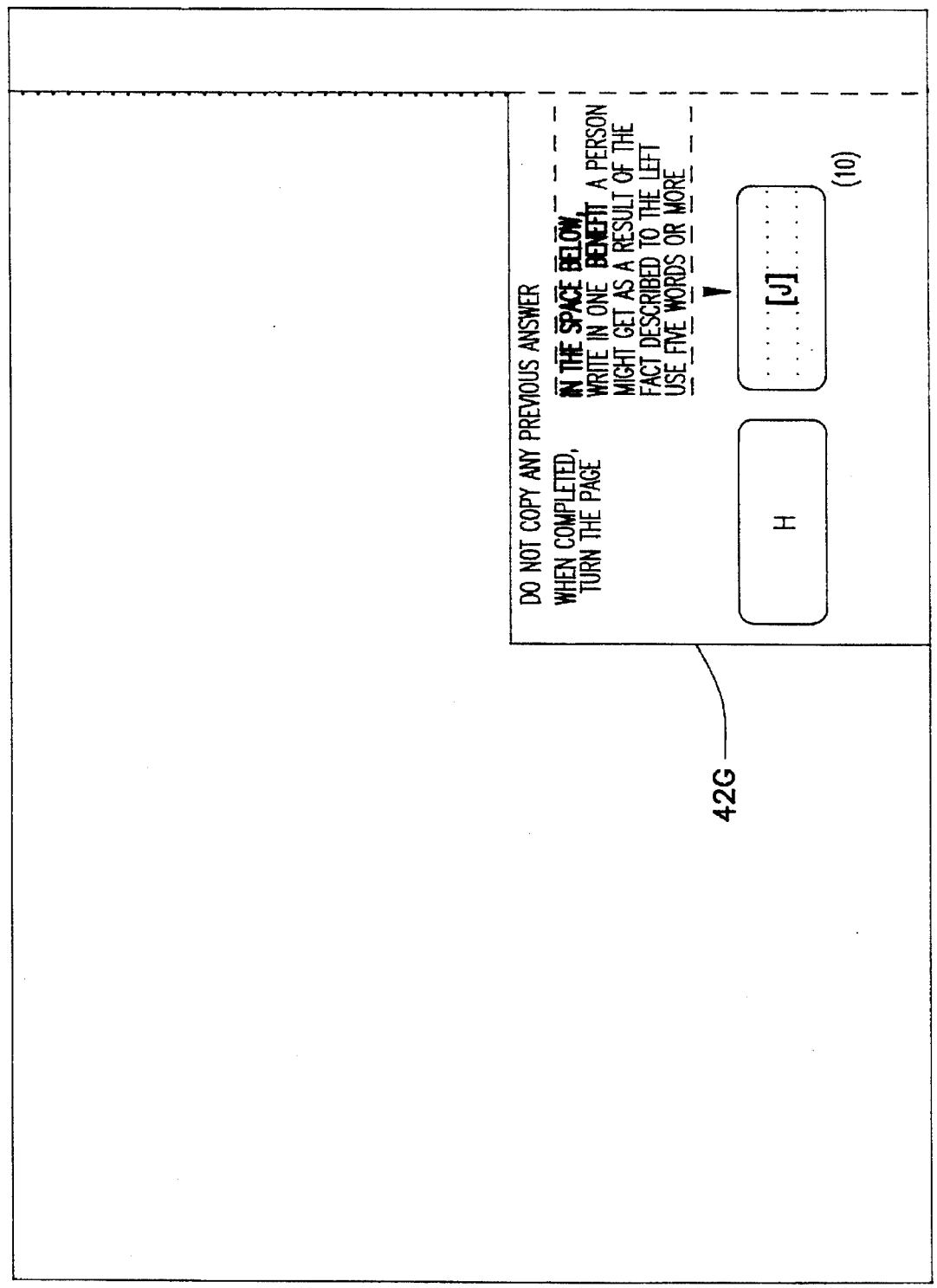
Figure 2H:
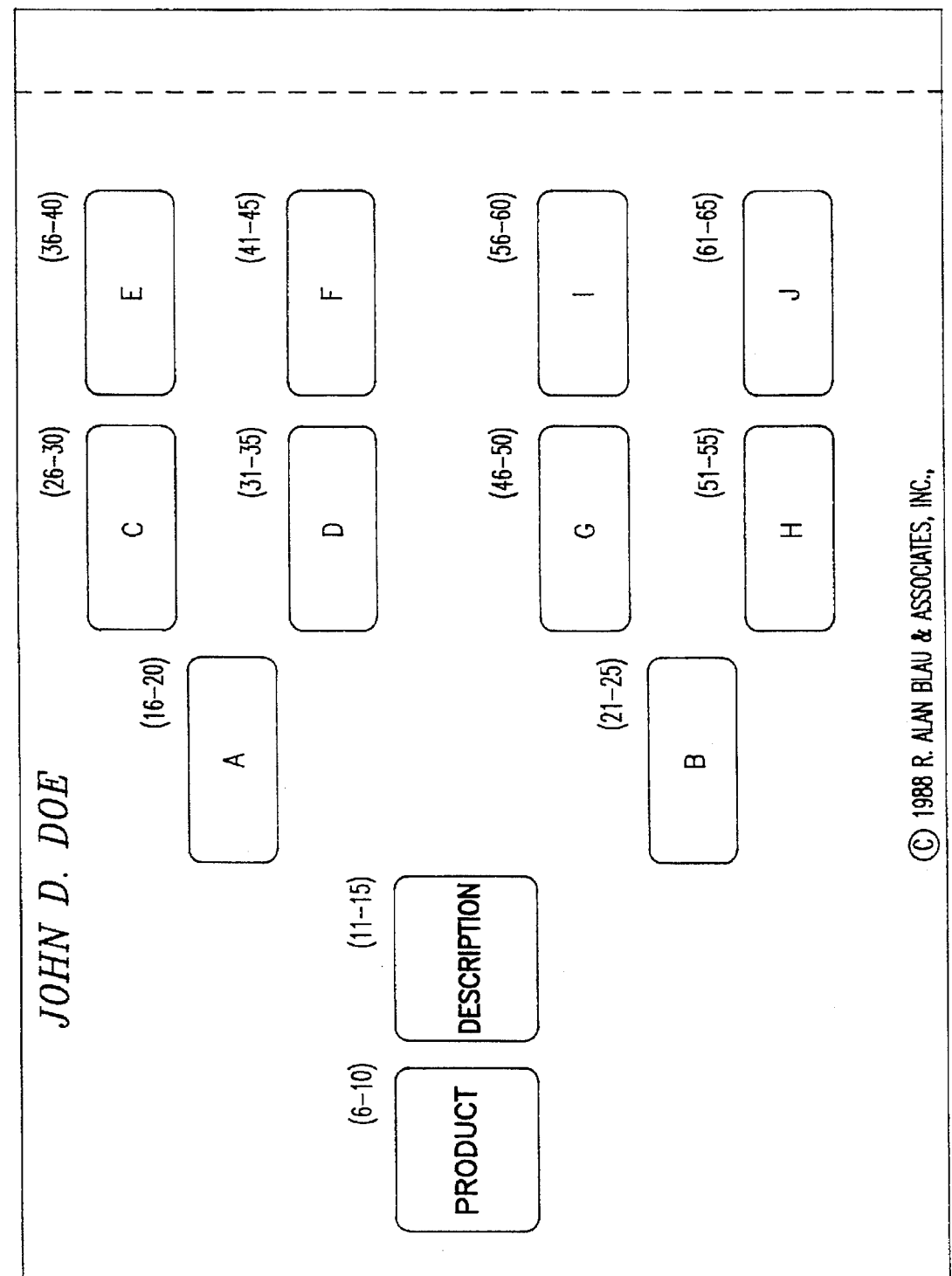
Figure 3B:
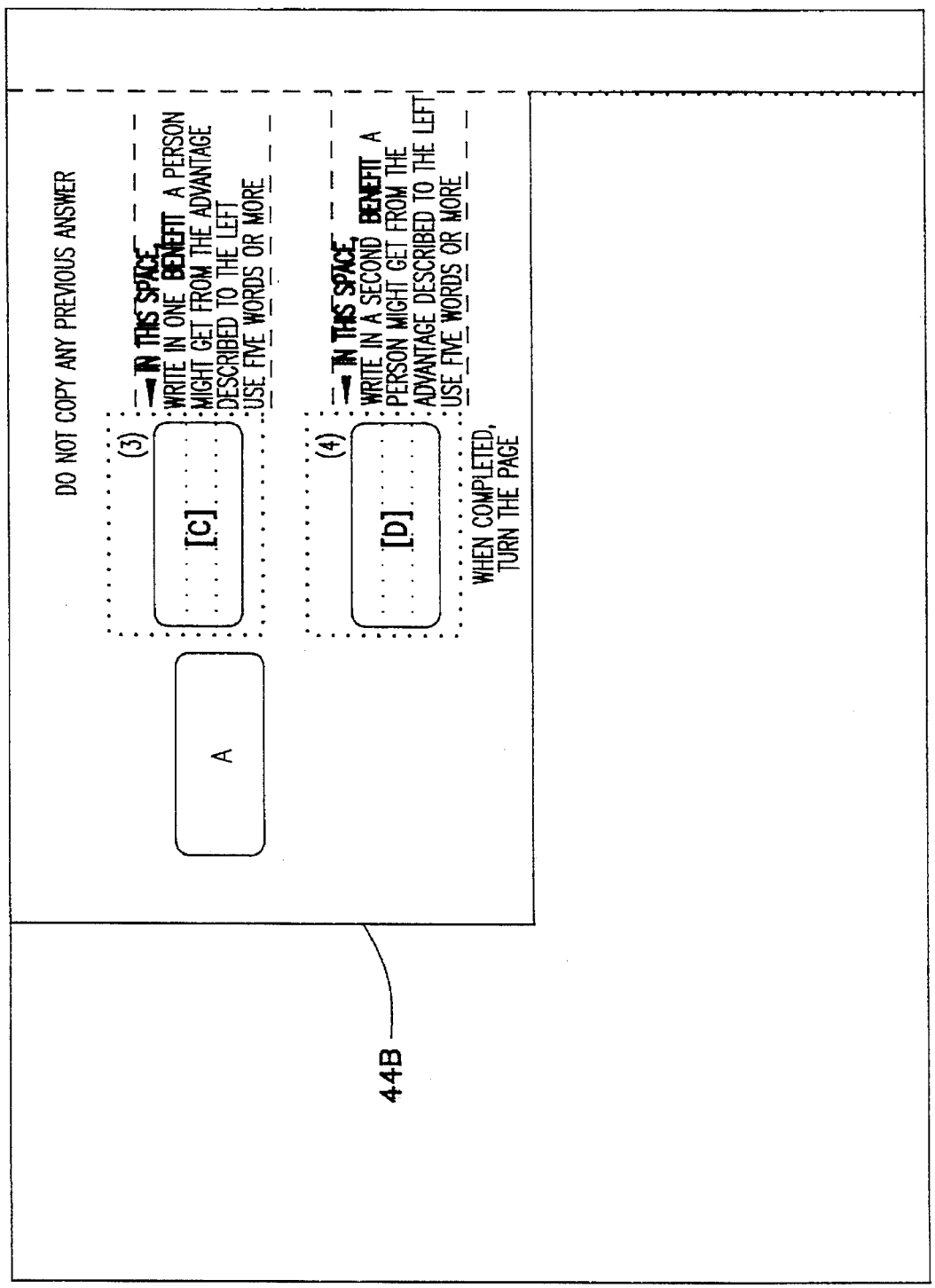
Figure 3D:
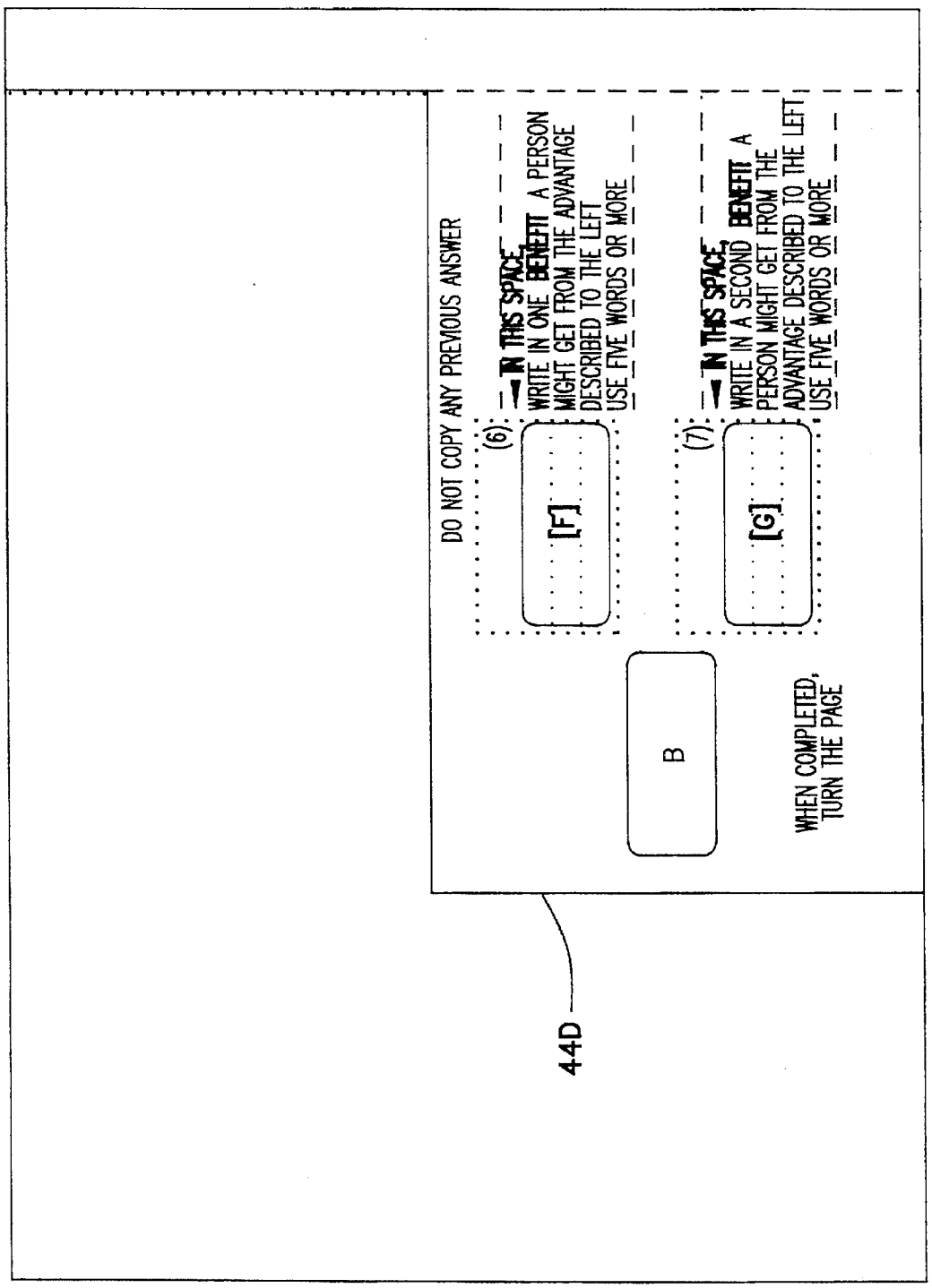
Figure 3F:
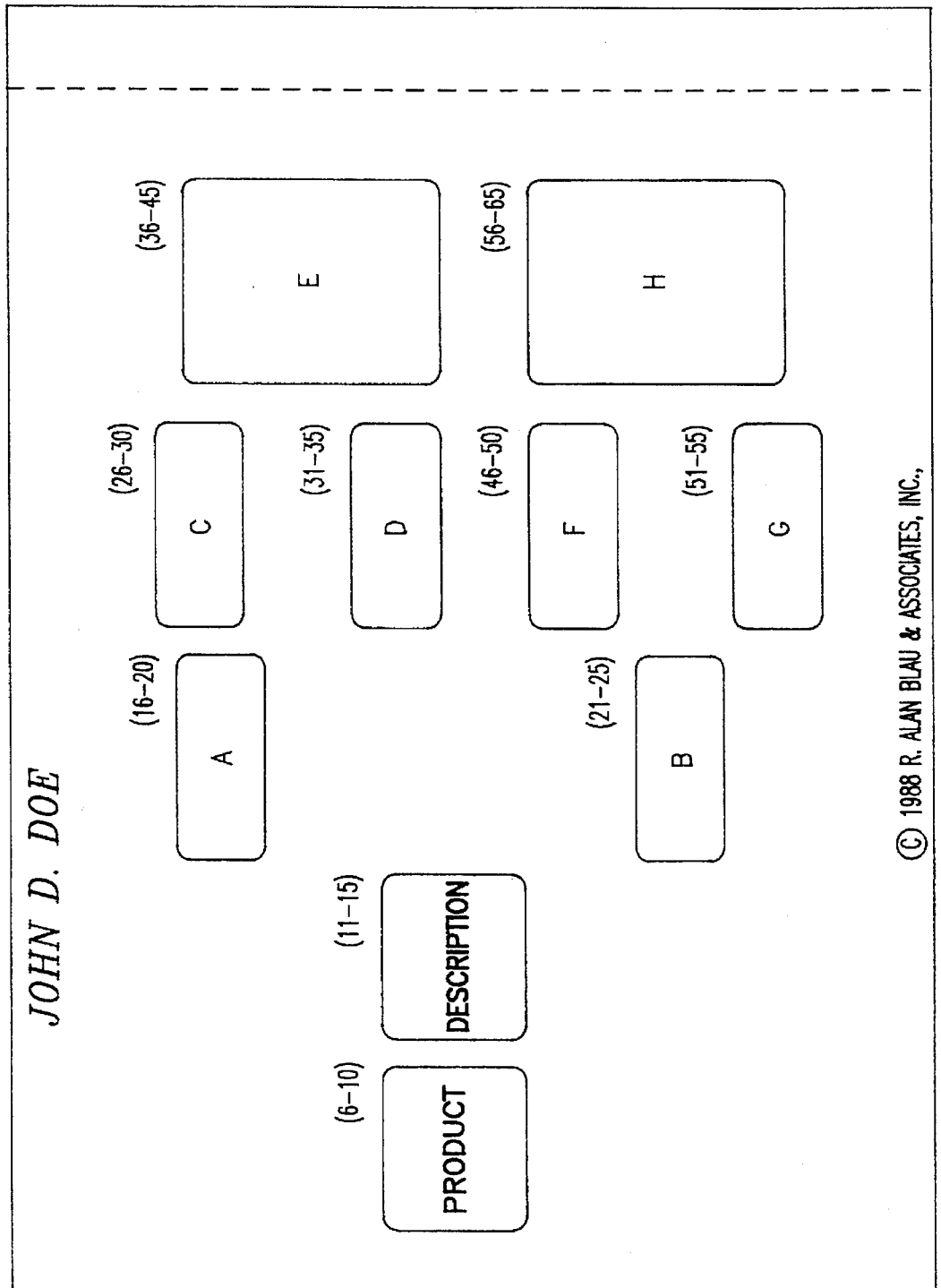

Referring now to FIG. 1 there is shown an embodiment of a system in accordance with the present invention, the system being generally referenced by the reference numeral 20. As shown, the system includes a computer system 22 such as a 386 microcomputer, a storage device 24 such as a hard drive, a printer 26 such as a dot matrix or laser printer, an input terminal 28 such as a standard keyboard, a display 29 such as a NEC™ multi-frequency display, and a scanner 30 such as an HP™ desk scanner. As illustrated in the embodiment, forms 40 containing consumer responses are scanned by the scanner 30 and input into the computer system 22 for storage on the storage device 24. It will be appreciated that consumer responses might also be input via the input terminal 28 by an operator manually reading the consumer responses contained on the forms and then inputting the information into the computer system 22. Additionally, as opposed to filling out a form, consumers might use the input terminal 28 in association with the display 29 to input the responses directly into the computer system as they are queried by queries appearing at the display 29. It will be appreciated that any number of input terminals 28 and displays 29 might be interconnected to the computer system in a multi-user arrangement. Moreover, individual computer systems 22 might be interconnected via a local area network configuration. Additionally, modems might be used to interconnect the computer system 22 to remote terminals.

Illustrated in FIGS. 2A–2H is a multi-page prior art form 42. A first page 42A of the form provides descriptive product information and asks the consumer to list two different advantages at locations [a] and ]b] which a person might get from the product description. The product information might be presented in various formats other than writing. For example, photos, illustrations, advertisements, packaging, product samples, etc. might be used. As illustrated by the dotted lines, the space for listing the advantages might be provided with lines to assist the user in writing in the information. On a second page 42B, the consumer is asked to list two benefits derived from the first listed advantage. On a third page 42C, the consumer is asked to list a benefit a person might get as a result of the first benefit listed on page 42B. On a fourth page 42D, a consumer is asked to list yet another benefit derived from the second benefit listed on page 42B. Pages 42E–42G go through a similar series of queries for the second advantage listed on the first page 42A. Finally, a last page 42H lists a summary of the consumer responses. It will be appreciated that the multiple page form 42 is suitably structured so as to achieve the appropriate transfer of information from one page to the next. For example, carbon layers might be provided over those areas of each page where information transfer is desired. Moreover, the prior art, multiple page form has its pages fastened to each other along one edge, the pages being perforated to allow rapid separation.

Illustrated in FIGS. 3A–3F is a multiple page form 44 in accordance with the principles of the present invention. A first page of the form 44A provides descriptive product information and further provides for two separate locations for the consumer to list two separate advantages of a product as described. On page 44B, the consumer is queried to list two separate benefits which are derived from the first advantage. On page 44C, the consumer is asked to describe a situation in which a person might experience satisfaction from the benefits previously listed on page 44B. On page 44D, the consumer is asked to list two benefits derived from the second advantage listed on the first page 44A. On page 44E, the consumer is asked to describe a situation in which a person might experience satisfaction from the two benefits listed on page 44D. On a last page 44F, is a complete outline or summary of the consumer responses. As with the prior form, this form is suitably studied so as to achieve the appropriate transfer of information from one layer to the next. The individual papers are preferably attached to each other and perforated to allow separation.

It will be noted that in particular on pages 44C and E, the consumer is asked to describe a situation in which a person might experience satisfaction from the benefits previously identified. This is particularly important since, consumers in the present invention can now describe their perception of the benefits derived from the product in terms of a situation, also referred to as an image, which they associate with the product use.

The survey of the present invention will illustrate that men and women as consumers have very different needs and values relating to the purchase of products. Thus, different and meaningful concept definitions can be provided for male and female target markets. The concept definition for men and women might typically include specific personal presence and emotional benefits, as well as imagery concerning self-confidence, self-esteem, success, recognition and goal achievement, especially in business, work, family, social, personal and intimate situations.

Once the consumer responses have been obtained, the responses can then be processed. Illustrated in FIG. 4 is a sample response summary wherein the advantages, benefits and situations are summarized in terms of percentages.

In one embodiment of the present invention, a key word study is conducted, an example of such a study being shown in FIG. 5 which illustrates a summary of key words and their frequency of occurrence for advantages, benefits and situations.

It is to be understood, that even though numerous characteristics and advantages of the invention have been set forth in the foregoing description, together with details of the structure and function of the invention, the disclosure is illustrative only and changes may be made in detail, especially in matters of shape, size and arrangement of the parts within the principles of the invention to the full extent indicated by the broad general meaning of the terms in which the appended claims are expressed.

What is claimed is:

1. A method carried out on a programmed computer of obtaining product marketing information from consumers, the method comprising the steps of:

the programmed computer presenting a first page on a display apparatus, the first page providing descriptive product information to a consumer and querying the consumer to provide an open ended response specifying at least one advantage derived from the product information;

the programmed computer presenting a second page on the display apparatus, the second page listing the advantage provided by the consumer and querying the consumer to provide another open ended response specifying at least one benefit derived from the advantage previously provided by the consumer, the product information being concealed from the consumer at this time;

the programmed computer presenting a third page on the display apparatus, the third page listing the benefit provided by the consumer and querying the consumer to provide an additional open ended response specifying at least one situation in which a person might experience satisfaction from the benefit previously provided by the consumer, the product information and the advantage previously provided by the consumer being concealed from the consumer at this time;

the programmed computer storing the consumer responses, including categorizing the consumer responses into advantages, benefits, and situations and storing the categories of responses into memory electronically connected to the programmed computer;

the programmed computer searching the consumer responses stored in the memory for character strings and determining the frequency that each character string appears in each of the advantages, benefits and situations categories; and the programmed computer displaying on the display apparatus the frequency that at least some of the character strings stored in memory occur in each of the advantages, benefits and situations categories.

2. A method in accordance with claim 1, wherein the step of the programmed computer presenting the first page on the display apparatus includes presenting the first page querying the consumer to provide two advantages derived from the product information.

3. A method in accordance with claim 2, wherein the step of the programmed computer presenting the second page on the display apparatus includes presenting two second pages, each of the second pages listing one of the advantages provided by the consumer and querying the consumer to provide two benefits derived from the advantage previously provided by the consumer, the product information not being displayed on the display apparatus at this time so as to be visible to the consumer at this time.

4. A method in accordance with claim 3, wherein the step of the programmed computer presenting the third page on the display apparatus includes presenting two third pages, one of the third pages listing the two benefits provided by the consumer for a first of the two advantages and one of the third pages listing the two benefits provided by the consumer for a second of the two advantages, each of the third pages querying the consumer to describe at least one situation in which a person might experience satisfaction from the two benefits presented, the product information and the advantage previously provided by the consumer not being displayed on the display apparatus at this time so as to be visible to the consumer at this time.

5. The method of claim 1, wherein the step of presenting a second page includes having the programmed computer block access to the product information, and the step of presenting a third page includes having the programmed computer block access to the product information and the advantage previously provided by the consumer.

6. A method for obtaining product marketing information from consumers, the method comprising the steps of:

presenting a first page providing descriptive product information to a consumer and querying the consumer to provide an open ended response specifying at least one advantage derived from the product information;

presenting a second page listing the advantage provided by the consumer and querying the consumer to provide another open ended response specifying at least one benefit derived from the advantage previously provided by the consumer, the product information being concealed from the consumer at this time;

presenting a third page listing the benefit provided by the consumer and querying the consumer to provide an additional open ended response specifying at least one situation in which a person might experience satisfaction from the benefit previously provided by the consumer, the product information and the advantage previously provided by the consumer being concealed from the consumer at this time;

inputting the consumer responses into a programmed computer for categorizing the consumer responses into advantages, benefits, and situations and storing the categories of responses into memory electronically connected to the programmed computer;

the programmed computer searching the consumer responses stored in the memory for character strings and determining the frequency that each character string appears in each of the advantages, benefits and situations categories; and the programmed computer displaying on a display apparatus the frequency that at least some of the character strings stored in memory occur in each of the advantages, benefits and situations categories.

7. A method in accordance with claim 6, wherein the step of presenting the first page includes querying the consumer to provide two advantages derived from the product information.

8. A method in accordance with claim 7, wherein the step of presenting the second page includes presenting two second pages, each of the second pages listing one of the advantages provided by the consumer and querying the consumer to provide two benefits derived from the advantage previously provided by the consumer.

9. A method in accordance with claim 8, wherein the step of presenting the third page includes presenting two third pages, one of the third pages listing the two benefits provided by the consumer for a first of the two advantages and the other of the third pages listing the two benefits provided by the consumer for a second of the two advantages, each of the third pages querying the consumer to describe at least one situation in which a person might experience satisfaction from the two benefits presented.

* * * * *